Patented Dec. 22, 1925.

1,566,841

UNITED STATES PATENT OFFICE.

EDWARD L. DILLMAN, OF JAMAICA, NEW YORK.

METHOD OF MAKING PORCELAIN ARTICLES.

No Drawing.    Application filed March 19, 1925. Serial No. 16,862.

*To all whom it may concern:*

Be it known that I, EDWARD L. DILLMAN, a citizen of the United States, and a resident of the city of New York, Jamaica, borough of Queens, in the county of Queens and State of New York, have invented a new and Improved Method of Making Porcelain Articles, of which the following is a full, clear, and exact description.

This invention relates to a method of making porcelain articles, and the invention includes certain novel steps in the method as well as a novel mold composition.

Heretofore porcelain articles have been shaped and then exposed in a kiln for fusing. Such articles are apt to crack and become misshapen, and a very large percentage of porcelain articles thus made are defective or entirely worthless.

It is a primary object of my invention to provide an improved method of making porcelain articles which will result in an accurate and more perfect product, which will cheapen the operation and the consequent product, which will result in a saving of time and labor, and which will permit the employment of a type of labor and workmanship such as required with known methods.

One art to which my invention is particularly adapted is that of dentistry and more specifically relates to the manufacture of porcelain dental plates, although I would have it understood distinctly that I claim the invention in its broadest possible sense to include the manufacture of any porcelain articles with which the method may be carried out.

The invention therefore consists in certain novel steps in the method and a certain novel combination of ingredients to form a mold composition, all of which will be more fully hereinafter described and pointed out in the claim.

First of all, I will set forth what I believe to be a preferable mold composition which may be employed in carrying out my improved method:

|                              | Per cent. |
|------------------------------|-----------|
| Pulverized plaster of Paris  | 60        |
| Pulverized asbestos          | 10        |
| Pulverized silex             | 30        |
| Total                        | 100       |

It is to be understood that a considerable variation may be made in the proportions given and that equivalent ingredients, or ingredients giving equivalent results or functions, might be employed without departing from the invention and hence I do not wish to be limited to the exact tabulation of ingredients or to their proportions above given.

The above ingredients are thoroughly mixed with a sufficient amount of water so as to render the mass plastic or semifluid, as may be desired. This mass is poured or otherwise located within a suitable flask. After it is set sufficiently, a pattern or model is placed in the composition between the two halves of the mold which are held in the members of the flask, such as commonly employed.

If the invention has to do with the manufacture of porcelain dental plates, the pattern will be of wax or analogous material which can be removed, leaving the teeth in the mold. The ordinary method is to remove as much wax as can be conveniently done by manual effort and then wash out the remaining wax by the use of warm water.

In the impression of the mold or mold members the porcelain body is poured or tamped. In the use of this term "porcelain body" I would have it understood that I employ the same to indicate any of the well known mixtures which when fused will form porcelain.

The next step is to insert the mold with the porcelain body therein into a kiln or other heating apparatus, and would call particular attention to this step in the matter. In the ordinary method, the article is shaped and then removed from the mold or shaping machine and placed in the kiln and directly exposed to the heat. With my improved method, the article while it is retained in the mold is inserted in the kiln, and the entire mass including the mold and the article is subjected to the heat of the kiln for the desired length of time in order that the ingredients of the article may become fused so that a perfect porcelain article will be the result.

The mold material constitutes a composition which will not fuse in the kiln although it will perfectly hold the article while the latter is fusing. By such a method the article is held in shape, is prevented from shrinkage, and receives a uniform, evenly distributed temperature until the fusing operation is complete.

When the fusing operation is completed the mold and the porcelain article therein are allowed to become cool. A portion of this cooling may be done within the kiln, or any ordinary or well known practice of cooling may be carried out.

When entirely cool the mold with the article therein is immersed in water and the water will serve to disintegrate the mold, leaving the porcelain article clean and free of the mold composition. The composition of the mold is such that it will not fuse so that it will readily disintegrate when emmersed.

So far as I have any knowledge, this broad idea on the method of making porcelain articles is new and I desire to cover the same in its broadest possible sense, as will be more fully hereinafter set forth in the claim.

I claim:

The herein described method of making porcelain articles, consisting in forming a mold of non-fusing composition, then making an impression in the mold, then filling the impression with fusible material, then placing the mold with the fusible material therein in a kiln and subjecting the same to the proper temperature for a desired period, then allowing the mold and the article to cool, and then removing the mold from the article by immersing the mold in water so that the material of the mold will disintegrate.

EDWARD L. DILLMAN.